Patented Nov. 30, 1943

2,335,347

UNITED STATES PATENT OFFICE 2,335,347

METHOD OF REMOVING WEAKLY ACIDIC SULPHUR COMPOUNDS FROM HYDROCARBON OIL

Timothy L. McNamara, Highland Park, Ill., assignor to The Pure Oil Company, Chicago, Ill., a corporation of Ohio No Drawing. Application June 20, 1940, Serial No. 341,500

9 Claims. (Cl. 196—30)

This invention relates to a method and reagent for removing weakly acidic substances from water immiscible liquids and more particularly to method and reagent for removal of mercaptans and other acidic sulphur compounds from hydrocarbon oils.

It is common practice in the petroleum refining industry to treat cracked distillates with caustic alkali solution, either aqueous or alcohol, in order to remove both hydrogen sulphide and mercaptans. Although the major portion of the mercaptans and other acidic sulfur bodies can be removed from the distillate by caustic washing, the distillate cannot be rendered sweet to the doctor test by caustic washing alone. It is usually necessary to resort to a subsequent treatment with sodium plumbite to obtain a doctor sweet distillate.

More recently it has been proposed to add to the caustic solution alkali salts of the more volatile members of the fatty acid series, for example, sodium or potassium isobutyrate in order to enhance the mercaptan extracting ability of the caustic alkali solution. The use of such salts, commonly known as solutizers, has proved to be beneficial but they are incapable of effecting sweetening of the more refractory distillates.

I have discovered that if spent caustic alkali solution from the treatment of hydrocarbon oils containing phenolic and/or naphthenic acid substances is neutralized and the acid oil obtained from the neutralization of the spent alkali solution is carefully concentrated at temperatures where decomposition of the acid oil does not take place, the residuum acid oil is highly efficacious when disolved in caustic alkali solution, in the removal of acidic sulphur compounds from hydrocarbon oils and distillates.

As an illustration of my invention, spent aqueous caustic soda solution which has been used for the removal of acidic substances from a blend of cracked gasoline distillates produced by the high pressure thermal cracking of a mixture of Van Zandt and Schuler crudes, and of the straight run gasolines from these crudes, was neutralized with hydrochloric acid to a methyl orange end point. An acid oily layer separated which upon analysis was found to contain among other compounds the following:

Isobutyric acid
Isovaleric acid
Naphthenic acid
Thio-phenol
o-Thio-cresol
p-Thio-cresol
Phenol
o-Cresol
m-Cresol The acid oil also had a mercaptan content of 1.01% by weight and a total sulphur content of 2.49% by weight. The acid oil was washed with 50% by volume of water in order to remove any residual alkali or mineral acid. After washing, the acid oil was distillated under a vacuum of six millimeters of mercury absolute and the temperature was kept below 270° F. during the distillation. The distillation was continued until 86% of the charge was taken overhead, leaving 14% bottoms in the still.

A solution was prepared containing 31.8% by weight of water, 34.1% by weight of potassium hydroxide and 34.1% by weight of the 14% acid oil bottoms. This solution was then used to treat an untreated hydrocarbon rubber solvent having the following characteristics:

Mercaptan sulphur content _____ .0248
IBP _____°F__ 104–114
50% recovered _____°F__ 170–190
EP _____°F__ 270
API gravity _____ 69–70

The rubber solvent was obtained by non-cracking distillation of Illinois crude.

A second reagent was prepared by mixing together 31.8% by weight of water, 34.8% by weight of potassium hydroxide and 34.1% by weight of the original acid oil before concentration. The comparative results obtained with both treating solutions are given in the table below:

Table

| Treating solution | Volume of treating solution per 100 volumes of rubber solvent | Number of treats to sweeten rubber solvent |
|---|---|---|
| Reagent containing 14% acid oil bottoms | 10 | 1 |
| Do | 5 | 1 |
| Do | 2.5 | 2 |
| Reagent containing unreduced acid oil | 10 | 2 |

Treatment of the rubber solvent with the treating reagent was carried out by mixing the two in a vessel by mechanical agitation for five minutes at atmospheric temperature, then permitting the mixture to settle, and the bottom layer constituting the reagent was drawn off.

Although in the specific example above given the acid oil was concentrated to 14% by weight of the original, it has been found that the portion of the acid oil which contains the highly reactive ingredients insofar as ability to extract mercaptans and other acidic sulphur compounds from oil is concerned, is contained in approximately the last 20% of the acid oil obtained from caustic alkali solutions used to treat gasoline. In order, therefore, to obtain a reagent of optimum activity, the acid oil should be reduced by careful distillation without decomposition until the bottoms are approximately not more than 20% of the total acid oil. It should be understood, however, that beneficial results can be obtained by concentrating to bottoms consisting of more than 20% of the total, but the improvement over the unconcentrated acid oil is not appreciable if the concentration is not carried to a point of at least 50%. By carefully separating the acid oil from caustic used to treat gasoline into 10% fractions, it has been discovered that the first eight 10% fractions are less efficacious in removing mercaptans and other acidic sulphur compounds from hydrocarbon oils than is the unconcentrated acid oil. Therefore, if the acid oil is concentrated to a point such that the bottoms constitutes more than 20% of the total, the bottoms will contain portions of the acid oil which are less efficacious than the total acid oil and therefore give a poorer extraction than the 20% or less bottoms per given quantity of concentrated acid oli.

Although in the specific illustration the temperature at which the acid oil is concentrated is kept below 270° F., higher temperatures may be used, but in no event should the temperature exceed approximately 350° F., since above this temperature decomposition of the acid oil takes place to an extent such that the ingredients in the acid oil which normally have a high degree of extracting power for mercaptans and other acidic sulphur compounds, are destroyed.

Although in the specific example given the acid oils were obtained from spent caustic resulting from the treatment of gasoline distillate by neutralization with hydrochloric acid, a concentrated acid oil suitable for use in the invention can be prepared from spent caustic used in the treatment of other cracked or straight run distillates such as kerosine and gas oil or heavier petroleum fractions and can be sprung from the caustic solution with other acids both mineral and non-mineral. When concentrating acid oil from spent caustic obtained from the treatment of higher boiling distillates and gasoline, it is not necessary to concentrate to the extent desirable in connection with spent caustic from the treatment of gasoline. I have found that the most active ingredients in the acid oil are contained in that fraction of the acid oil which has an initial A. S. T. M. distillation point of 400° F. and above.

In accordance with my invention either caustic soda or caustic potash aqueous or alcohol solutions may be used in which the concentration of free alkali is at least 5% by weight. Preferably caustic soda solutions containing from 10–30% of free alkali and caustic potash solutions containing 10–40% of free alkali are used. The concentrated acid oil should be present in amounts of at least 10% by weight based on the alkali solution and may be added in amounts up to the maximum amount soluble in the solution. Preferably, the acid oil is used in amounts ranging from 15% to 40% by weight of the alkali solution.

It will be apparent that the concentrated acid oil may be added to the solution as such or as the alkali compounds since it reacts with the alkali solution to form the alkali compounds.

I claim:

1. In a method for removing acidic substances from substantially neutral organic water immiscible liquid, the step which comprises contacting said liquid with a strong alkali solution to which has been added the alkali metal hydroxide reaction product of concentrated acid oil prepared by neutralizing spent caustic alkali solution from the treatment of substantially neutral organic water immiscible liquid containing material selected from the group consisting of phenolic and naphthenic acid constituents and removing the more volatile constituents from the separated acid oil by distillation without decomposition.

2. In the method of removing weakly acidic sulphur compounds from hydrocarbon oil, the step which comprises contacting said oil with strong alkali solution containing the reaction product of alkali metal hydroxide and acid oil recovered by neutralization from spent alkali solution containing material selected from the group consisting of phenolic and naphthenic acid constituents removed from hydrocarbon distillates, said acid oil having been concentrated by distilling off the more volatile constituents.

3. The step in accordance with claim 2 in which the concentrated acid oil has an initial A. S. T. M. distillation point above 400° F.

4. In the process of removing weakly acidic sulphur compounds from hydrocarbon oil, the step which comprises contacting the oil with an aqueous solution of a strong alkali containing in excess of 5% by weight of free alkali and in excess of 10% by weight of acid oil in the form of its reaction product with alkali metal hydroxide, which acid oil has been recovered by neutralization of used caustic alkali solution containing material selected from the group consisting of phenolic and naphthenic acid constituents removed from cracked gasoline, said acid oil having been concentrated by distilling off the more volatile constituents.

5. The step in accordance with claim 4 in which the concentrated acid oil consists of the residuum constituting not more than 50% of the original acid oil.

6. The step in accordance with claim 4 in which the concentrated acid oil consists of the residuum constituting not more than 20% of the original acid oil.

7. The step in accordance with claim 4 in which the concentrated acid oil has an initial A. S. T. M. boiling point above 400° F.

8. In the process of removing weakly acidic sulphur compounds from hydrocarbon oils, the step which comprises contacting the oil with an aqueous solution of a strong alkali containing in excess of 5% by weight of free alkali metal hydroxide and in excess of 10% by weight of acid oil in the form of its reaction product with alkali metal hydroxide, which acid oil has been recovered from used caustic alkali solution containing material selected from the group consisting of phenolic and naphthenic acid constituents removed from petroleum oil fractions, said acid oil having an initial A. S. T. M. distillation point of at least 400° F.

9. The step in accordance with claim 8 in which the concentrated acid oil consists of the residuum constituting not more than 20% of the original acid oil.

T. L. McNAMARA.